United States Patent [19]

Robbins et al.

[11] Patent Number: 4,764,285
[45] Date of Patent: Aug. 16, 1988

[54] OIL SPILL MICROEMULSION DISPERSANTS

[75] Inventors: Max L. Robbins, South Orange; Gerard P. Canevari, Cranford; Jan Bock, Bridgewater, all of N.J.

[73] Assignee: Exxon Research and Engineering Company, Florham Park, N.J.

[21] Appl. No.: 50

[22] Filed: Jan. 2, 1987

Related U.S. Application Data

[63] Continuation of Ser. No. 839,547, Mar. 15, 1986, abandoned, which is a continuation of Ser. No. 613,716, May 24, 1984, abandoned.

[51] Int. Cl.$^4$ ............................................. E02B 15/04
[52] U.S. Cl. .................................... 210/749; 210/925; 252/312; 252/353; 252/354; 252/355; 252/358
[58] Field of Search ................ 210/749, 925; 252/312, 252/353, 354, 355, 356, 358

[56] References Cited

U.S. PATENT DOCUMENTS

| | | | |
|---|---|---|---|
| 3,793,218 | 2/1974 | Canevari | 252/354 |
| 3,998,733 | 12/1976 | Blanchard et al. | 210/925 |
| 4,146,499 | 3/1979 | Rosano | 252/312 |
| 4,252,657 | 2/1981 | Barriol et al. | 252/312 |
| 4,469,603 | 9/1984 | Lepain et al. | 210/749 |
| 4,472,291 | 9/1984 | Rosano | 252/312 |
| 4,502,962 | 3/1985 | Becker et al. | 210/925 |
| 4,597,893 | 7/1986 | Byford et al. | 210/925 |

*Primary Examiner*—Peter Hruskoci
*Attorney, Agent, or Firm*—Richard E. Nanfeldt

[57] ABSTRACT

Disclosed is a method for dispersing an oil spill on sea water which method comprises applying to the oil spill surface an effective amount of: (i) a blend of one or more hydrophilic and one or more lipophilic surfactants whose ratio is so adjusted that they will form microemulsions with the sea water and the oil to be dispersed, (ii) a solvent which is miscible with the oil to be dispersed and in which the blend of surfactants is substantially soluble, and (iii) from 0 to about 10 wt. % water. The blend of surfactants is such that it lowers the interfacial tension between the oil to be dispersed and the sea water to less than about 250 mdynes/cm when the blend is used at a treat rate of less than about 1 to 100 by weight, based on the weight of the oil to be dispersed.

16 Claims, No Drawings

OIL SPILL MICROEMULSION DISPERSANTS

This is a R-60 Continuation of Ser. No. 839,547 filed 3/15/86, now abandoned, which was a R-60 Continuation of Ser. No. 613,716, filed 5/24/84 on P.M. 82-Cl-159, now abandoned.

FIELD OF THE INVENTION

The present invention relates to the preparation of novel surfactant blends and their use for dispersing oil spills.

BACKGROUND OF THE INVENTION

Accidental discharges of oil close to shore can have serious detrimental effects on the environment. Consequently, it is desirable to treat the discharge so that rapid dispersion of oil into the sea water is accomplished. This requires that the dispersant penetrate the oil film and rapidly spread at the oil/water interface, thereby sharply lowering the oil/water interfacial tension. For good dispersion at the relatively low shear supplied by wave motion, ultra-low interfacial tensions are required. The design of a good oil spill dispersant involves blending surfactants to achieve such low interfacial tensions at very low surfactants to oil treat rates, generally in the range of 1/100 to 1/500 by weight. The requirement that the dispersant mixture be effective at such low concentrations establishes a low probability of success of empirically selecting the correct combination of surfactants. Consequently, there is a need in the art for surfactant systems suitable for economically dispersing oil-spills.

SUMMARY OF THE INVENTION

In accordance with the present invention there is provided a method for dispersing an oil spill on sea water which method comprises applying to the oil spill surface an effective amount of: (i) a blend of one or more hydrophilic and one or more lipophilic surfactants whose ratio is so adjusted that they will form microemulsions with the sea water and the oil to be dispersed, (ii) a solvent which is miscible with the oil to be dispersed and in which the blend of surfactants is substantially soluble, and (iii) from 0 to about 10 wt. % water. The blend of surfactants is such that it lowers the interfacial tension between the oil to be dispersed and the sea water to less than about 250 mdynes/cm when the blend is used at a treat rate of less than about 1 to 100 by weight, based on the weight of the oil to be dispersed.

In preferred embodiments of the present invention the surfactant ratio in the blend is adjusted so that it is either at Balance or on the hydrophilic side of Balance. The term Balance is defined by a set of operations and properties disclosed in the detailed description of the invention to follow.

In other preferred embodiments of the present invention the blend of surfactants is comprised of two or more surfactants selected from one or both of:

(a) an alkali metal, ammonium, alkyl ammonium, alkanol ammonium or ethoxylated alkyl or alkanol ammonium salt of an alkyl or alkyl aryl sulfonic acid of the generic formula:

$$R-SO_3H$$

wherein R is an alkyl or alkyl benzene group containing 8 to 30 carbon atoms in the alkyl chain and the benzene ring may be additional substituted with one or two alkyl groups containing 1-3 carbon atoms each, and (b) an ethoxylated surfactant of the generic formula:

$$R_1X(CH_2CH_2O)_nY$$

wherein $R_1$ is an alkyl or mono- or di-alkyl aryl group containing 8 to 30 carbon atoms, X is —O—, —S—,

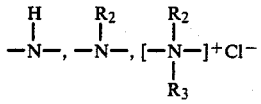

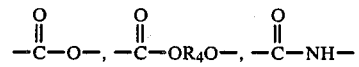

or —SO$_2$NH—

Y is —H, —SO$_3$—M$^+$ or —(PO$_3$H)$^-$M$^+$ wherein M$^+$ is an inorganic on ammonium cation including alkyl substituted ammonium cations;

$R_2$ is an alkyl group containing 1 to 20 carbon atoms or a polyethoxy ether group containing from 1 to 30 (CH$_2$CH$_2$O) groups;

$R_3$ is H or an alkyl group containing 1 to 3 carbon atoms;

$R_4$ is a poly hydroxy group derived from glycerol, glycols, sorbitol, or various sugars; and n is an integer from 1 to 30.

In other preferred embodiments of the present invention the solvent used is a hydrocarbon solvent which may contain a cosolvent selected from the group consisting of alkylene glycol monoalkyl ethers and C$_2$ to C$_5$ alkanols.

In yet other preferred embodiments of the present invention the surfactant blend contains one or more of (i) the sodium or monoethanol amine salt of C$_{12}$-o-xylene sulfonic acid, and (ii) an ethoxylated dinonyl phenol containing 9 moles of ethylene oxide per mole of surfactant.

In a most preferred embodiment of the present invention the surfactant blend contains one or more of the ethoxylated alkyl ammonium salts of alkyl aryl sulfonic acids containing two to twenty ethylene oxide groups per molecule.

DETAILED DESCRIPTION OF THE INVENTION

In the practice of the present invention, at least two or more surfactants are selected and balanced with respect to their combined hydrophilic and lipophilic properties such that they cause an interfacial tension (hereinafter sometimes referred to as IFT) of less than about 250 mdynes/cm at the oil/sea water interface.

Preferably, the blend of surfactants used herein is such that the weight ratio of the hydrophilic portion to the lipophilic portion is adjusted so that when equal volumes of the oil and sea water are mixed with 1.5 gm surfactant blend per 100 ml of oil and sea water, the resulting mixture separates on standing to form a middle microemulsion phase containing equal volumes of sea water and oil in equilibrium with equal volumes of excess oil and sea water. Such a microemulsion is said to be at Balance. The larger the volume of microemulsion phase at Balance, the greater the reduction in IFT between the oil and the sea water and the more effective the surfactant blend is as an oil spill dispersant. The microemulsion phase should preferably occupy at least 20% of the total volume.

Although the surfactants selected for Balance are effective oil spill dispersants, best results are obtained when the surfactant blend is on the hydrophilic side of Balance. That is, if the ratio of hydrophilic surfactants to lipophilic surfactants is increased sufficiently beyond that required for Balance, a lower phase microemulsion will form. The term "lower phase microemulsion" is defined below by a set of operations and properties. Such surfactant blends, in an appropriate solvent, are more preferred as oil spill dispersants as long as they are still capable of lowering the IFT between the oil and sea water to less than about 250 mdynes/cm when the blend is used at a treat rate of less than about 1 to 100 by weight, based on the weight of oil to be dispersed.

The hydrophile for purposes of this invention is defined as a surfactant having the properties of providing at 1.5 wt.% concentration in equal volumes of the oil and sea water, a lower phase microemulsion at 20° C. and provides to said sea water an interfacial tension less than about 0.5 dynes/cm, preferably less than about 0.2 dynes/cm when measured against said oil at 20° C. The term "lower phase" microemulsion is descriptive in context since it means that the aforementioned system consisting of the hydrophilic surfactant and equal volumes of oil and sea water separates into an aqueous lower phase containing most of the surfactant in equilibrium with an excess oil phase which is essentially surfactant-free.

The hydrophile which is defined by the above properties includes, but is not limited to the alkyl and alkylaryl sulfonic acid salts wherein the alkyl group is a $C_9$ to $C_{18}$ linear, branched, or bilinear structure; the aryl group is selected from benzene, toluene, orthoxylene, and naphthalene; and the salt is a salt of an alkali metal or alkanol amine. Also included, and preferred are the ethoxylated alkylphenols. Most preferred are the ethoxylated $C_{12}$–$C_{18}$ alkyl ammonium salts of $C_9$–$C_{24}$ alkyl and alkylaryl sulfonic acids containing 6 or more ethylene oxide (hereinafter EO) groups, wherein the alkyl and aryl groups are as previously defined above.

Representative examples of hydrophilic alkyl and alkylaryl sulfonic acid salts include monoethanol ammonium nonyl o-xylene sulfonate, sodium dodecyl benzene sulfonate, ammonium tetradecyl benzene sulfonate, diethanol ammonium hexadecyl benzene sulfonate, and sodium dodecyl naphthalene sulfonate. Preferred hydrophilic sulfonic acid salts include heptaethoxy octadecyl ammonium dodecyl o-xylene sulfonate (designated $C_{12}XS$-Et7) and decaethoxy octadecyl ammonium dodecyl ortho xylene sulfonate (designated $C_{12}XS$-Et10). The ethoxylated alkyl amines used in preparing the ethyoxylated alkyl ammonium salts of alkyl aryl sulfonic acid can be obtained from Akzo Chemie America under the trade name Ethomeens ®.

Representative hydrophilic ethoxylated alkyl phenols include Igepal ® DM 710, Igepal ® DM 730 and Igepal ® DM 880 available from GAF which are chemically di-nonyl phenols ethoxylated with 15, 24 and 49 moles of EO, respectively. Preferred is Igepal ® DM 530 which is dinonyl phenol ethoxylated with 9 moles of ethylene oxide. Other suitable ethoxylated alkyl phenols include Tritons ® X100, X102 and X114 available from Rohm and Haas of Philadelphia, Pa., and Igepals C0 610, 630, 660, 710, 720, 730, 850 and 880 which are chemically mono-octyl or nonyl phenols ethoxylated with from 8 to 30 moles of EO.

The lipophile, for purposes of this invention is a surfactant having the properties of providing at 1.5 wt.% concentration in equal volumes of oil and sea water, an upper phase microemulsion at 20° C. and provides to said oil an interfacial tension of less than 0.5, preferably less than 0.2, dynes/cm when measured against said sea water at 20° C. The term "upper phase" microemulsion as used in defining the lipophilic surfactant ingredient means that the system consisting of the surfactant in equal volumes of oil and sea water separates into a surfactant-containing oil upper phase in equilibrium with an excess aqueous phase which is essentially surfactant-free.

The lipophile having been defined by the above properties includes, but is not limited to, the ethoxylated alkyl phenols. Also included, and preferred, are the alkyl and alkylaryl sulfonic acid salts wherein the alkyl group is a $C_{12}$ to $C_{24}$ linear, branched, or bilinear structure; the aryl group is selected form benzene, toluene, orthoxylene, and naphthalene; and the salt is a salt of an alkali metal or alkanol amine. More preferred are the ethoxylated $C_{12}$–$C_{18}$ alkyl ammonium salts of $C_9$–$C_{24}$ alkyl and alkylaryl sulfonic acids containing less than six EO groups, wherein the alkyl and aryl groups are as previously defined above.

Representative examples of lipophilic alkyl aryl sulfonates include monoethanol ammonium dodecyl o-xylene sulfonate, sodium tetradecyl o-xylene sulfonate, sodium hexadecyl o-xylene sulfonate, diethanol ammonium pentadecyl o-xylene sulfonate, triethanol ammonium octadecyl o-xylene sulfonate (prepared from penta and hexa propylene), sodium octapropylene benzene sulfonate, sodium tetracosyl toluene sulfonate, and various high molecular weight petroleum sulfonates. Preferred are the sodium and monoethanol ammonium salts of dodecyl o-xylene sulfonic acid. Preferred is penta ethoxy octadecyl ammonium dodecyl o-xylene sulfonate (designated $C_{12}XS$-Et5).

Representative lipophilic ethoxylated alkyl phenols include Igepals CO 210 and CO 430 which are nonyl phenols containing 1.5 and 4 moles of EO respectively, and Tritons ® X15 and X35 which are octyl phenols containing 1 and 3 moles of EO, respectively.

The present invention is not confined to the use of the aforementioned ethoxylated alkyl phenols but includes other ethoxylated surfactants of the generic formula:

$$R_1X(CH_2CH_2O)_nY$$

wherein $R_1$ is an alkyl or mono or di-alkyl aryl group containing 8 to 30 carbon atoms;

X is  —O—, —S—,

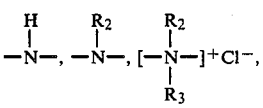

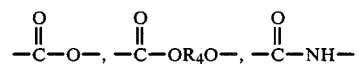

or —SO$_2$NH—;

Y is —H—, —SO₃⁻M⁺ or —(PO₃H)⁻M⁺ wherein M⁺ is an inorganic or ammonium cation including alkyl substituted ammonium cations;

R$_2$ is an alkyl group containing 1 to 20 carbon atoms or a polyethoxy ether group containing from 1 to 30 (CH$_2$CH$_2$O) groups;

R$_3$ is H or an alkyl group containing 1 to 3 carbon atoms;

R$_4$ is a polyhydroxy group derived from glycerol, glycols, sorbitol, or various sugars; and, n is an integer of from 1 to 30.

The above ethoxylated alkyl phenols may be blended with an alkali metal, ammonium, alkyl ammonium, alkanol ammonium or ethoxylated alkanol ammonium salt of an alkyl or alkyl aryl sulfonic acid of the generic formula:

R—SO₃H wherein R is an alkyl or alkyl benzene group containing 8–30 carbon atoms in the alkyl chain and the benzene ring may be additionally substituted with one or two alkyl groups containing 1–3 carbon atoms each to provide the balanced blends of surfactants. Preferred blends of ethoxylated alkyl phenols with alkyl aryl sulfonates include combinations of Igepal ® DM 530 or Igepal ® DM 710 with the sodium or monoethanol amine salt of C$_{12}$ o-xylene sulfonic acid.

Alternatively, ethoxylated alkyl ammonium (Ethomeen ®) salts of the above alkylaryl sulfonic acids containing varying degrees of ethoxylation are blended to provide the balanced blend of surfactants. Preferred blends of ethoxylated alkyl ammonium salts of alkylaryl sulfonic acids include pentaethoxy octadecyl ammonium dodecyl benzene sulfonate combined with heptaethoxy octadecyl ammonium dodecyl benzene sulfonate and diethoxy cocoa ammonium dodecyl o-xylene sulfonate with decaethoxy octadecyl ammonium dodecyl o-xylene sulfonate. Most preferred is the blend of pentaethoxy octadecyl ammonium dodecyl o-xylene sulfonate with hepta or deca ethoxy octadecyl ammonium dodecyl o-xylene sulfonate.

A hydrocarbon liquid (oil) acts as a solvent for the blend of surfactants and enters into a microemulsion with sea water. The hydrocarbon liquid, which may be comprised of one or more hydrocarbon oils, is selected such that (1) they are miscible with the oil to be dispersed, and (2) the surfactants are soluble in, or miscible with the hydrocarbon liquid, which hydrocarbon liquid may also contain water. For example, it may be beneficial to add up to about 10 wt.% water to improve the solubility of the surfactants in the hydrocarbon oil. Non-limiting examples of hydrocarbons suitable for use include Isopar ® M, No. 2 diesel fuel oil, kerosene, naphthas, white oil, and the like. The hydrocarbon oil is used in an effective amount, that is, an amount such that the viscosity of the blend of surfactants and hydrocarbon oil is such that it is suitable for delivery by the chosen technique, preferably spraying. The effective amount of course will vary depending upon the technique used to apply the surfactant blend to the oil spill and is within the skill of one having ordinary skill in the art to determine.

Under certain circumstances, up to 50, generally 10 to 25, weight percent of a cosolvent is included in the solvent to improve the solubility and reduce the viscosity of the surfactant in the hydrocarbon medium. The cosolvents are of the class of alkylene glycol monoalkyl ethers, C$_2$ to C$_5$ alkanols and mixtures thereof. Representative cosolvents include ethers such as ethylene glycol monopropyl ether, ethylene glycol monoethyl ether, ethylene glycol monomethyl ether, ethylene glycol monobutyl ether, diethylene glycol monomethyl ether, diethylene glycol monoethyl ether, diethylene glycol n-butyl ether, propylene glycol monomethyl ether, dipropylene glycol monomethyl ether and tripropylene glycol monomethyl ether, and alkanols which include straight and branched chain members such as ethanol, propanol, butanol, and pentanol. Of the alkanols, tertiary amyl alcohol (TAA) is preferred. Of the ethers, ethylene glycol monobutyl ether is preferred. It is understood, where appropriate some of the above cosolvents can be used in place of the hydrocarbon solvent. Non-limiting examples of the more preferred cosolvents which can be used in place of the hydrocarbon solvent include: ethylene glycol mono butyl ether, ethylene glycol mono ethyl ether, diethylene glycol mono ethyl ether and diethylene glycol mono butyl ether.

It is understood that when using a cosolvent, the ratio of the surfactants may have to be readjusted for changes in phase behavior brought about by the addition of the cosolvent.

The surfactant blend in a solvent of the present invention is preferably designed so that its density is greater than the oil to be dispersed but less than the sea water. Water itself may be used to adjust the density and/or the viscosity of the system which will result in an emulsion or microemulsion thereby improving delivery so that the surfactants sink to the oil-sea water interface in a relatively short period of time. The surfactant system is also such that once it gets to the oil-sea water interface, it lowers the oil-sea water interfacial tension below about 250, preferably below about 200, more preferably below about 100 mdynes/cm so that wave motion can easily disperse the oil.

In the practice of the present invention the surfactant system is applied to the oil spill by any suitable means such as spraying. Enough of the surfactant blend is applied such that the treat rate is less than about 1 to 100, preferably less than about 1 to 200, and more preferably less than about 1 to 500 by weight of the surfactants blend based on the oil to be dispersed, while maintaining the IFT at the oil-sea water interface below about 250 mdynes/cm.

The selection and balancing of the surfactant blend is illustrated by the following example. A 1.5 wt.% mixture of monoethanol ammonium dodecyl o-xylene sulfonate (hereafter C$_{12}$XS-MEA) with equal volumes of Isopar ® M and sea water forms an upper phase microemulsion at 20° C. which fixes C$_{12}$XS-MEA as the lipophile. Isopar ® M is an isoparaffinic solvent manufactured by Exxon Chemical Co. and is used here as a model oil in place of crude oil to facilitate the determination of equilibrium phase boundaries. The interfacial tension of a 1.5% solution of C$_{12}$XS-MEA in Isopar M is measured as 0.45 dynes/cm against sea water on the Spinning Drop Tensiometer. The IFT is below the design criterion of 0.5 dynes/cm.

For the hydrophile, an ethoxylated dinonyl phenol (Igepal DM 530 sold by GAF) containing 9 moles of ethylene oxide (designated EO) per mole of surfactant is selected. A 1.5 wt.% mixture of Igepal DM 530 (also called DM 530) with equal volumes of Isopar M and sea water forms a lower phase microemulsion at 20° C. The IFT of a 1.5% solution of Igepal DM 530 in sea water is measured as 0.08 dynes/cm and is well below the design criterion of 0.5 dynes/cm.

The combination DM 530/$C_{12}$XS-MEA represents a hydrophile-lipophile couple and their combined hydrophilic and lipophilic properties (H/L ratio) can be varied by adjusting the wt. ratio of DM 530/$C_{12}$XS-MEA. Various ratios of DM 530/$C_{12}$XS-MEA from 0.25/0.75 to 0.80/0.20 are dissolved in Isopar ® M at a total surfactant concentration of 50% thus forming a series of concentrates. A weight, 0.45 g, of each of the concentrates is added to test tubes each containing 7.5 ml of sea water and 7.5 ml of Isopar M. The tubes are shaken and allowed to settle at ambient temperature. At low DM 530/$C_{12}$XS-MEA ratio, sea water separates to the bottom leaving an upper phase microemulsion at the top. At high DM 530/$C_{12}$XS-MEA ratio, oil separates to the top leaving a lower phase microemulsion at the bottom of the tube. At DM 530/$C_{12}$XS-MEA ratios between 0.5/0.5 and 0.75/0.25 both sea water and oil separate out from a microemulsion residing between the excess water and oil phases. At a ratio of 0.59/0.41 the microemulsion phase resides at the center of the tube in equilibrium with equal volumes of brine and oil. This condition where the microemulsion contains equal volumes of oil and water is referred to as Balance and the surfactant blend is said to be balanced. The microemulsion phase at Balance for the DM 530/$C_{12}$XS-MEA blend occupies 25% of the volume. This volume defines the surfactant efficiency and is related to the interfacial tension between the oil and sea water. The larger the volume the lower the IFT. It is convenient to express surfactant efficiency in terms of the volume of oil or water held in the microemulsion at Balance per unit volume of surfactant. Water uptake is defined as the volume of water/volume of surfactant ($V_w/V_s$) in the microemulsion. Oil uptake is defined as the volume of oil/volume of surfactant ($V_o/V_s$). At Balance, water and oil uptakes are equal. For the DM 530/$C_{12}$XS-MEA blend $V_w/V_s = V_o/V_s = 7.5$ at Balance. For efficient oil spill dispersion, surfactant combinations are chosen which give uptakes at Balance greater than 5, preferably greater than 10 and more preferably greater than 15.

The following examples serve to more fully describe the manner of practicing the above-described invention. It is to be understood that these examples in no way serve to limit the true scope of this invention, but rather, are presented for illustrative purposes.

EXAMPLES 1 AND 2 AND COMPARATIVE EXAMPLE A

The apparatus used in these examples was the so called "Mackay-Nadeau-Steelman" apparatus. The use of this apparatus is described in the following publications, both of which are incorporated herein by reference. Mackay, D. and Szeto, F., "Effectiveness of Oil Spill Dispersants-Development of a Laboratory Method and Results for Selected Commercial Products", Institute for Environmental Studies, University of Toronto, Pub. No. EE-16, 1980; Mackay, D., Nadeau, S., and Ng. C., "A Small Scale Laboratory Dispersant Effectiveness Test", ASTP 659, Phila., PA, 1979.

Air was blown tangentially over a water surface at a desired turbulance level in a 30 cm diameter vessel containing 6 liters of sea water at 25° C., 10 ml of Murban crude oil was added to the surface in a surface containment ring followed by an amount of dispersant as specified in Table I below. The ring was removed and dispersion of the oil in the sea water resulted. After 10 minutes, a sample was taken and analyzed for oil content from which the percent of oil dispersed was calculated, the results can be found in Table I below. The uptake at Balance of the surfactant composition of Example 1 was found to be 15.1 and for Example 2 it was found to be 7.5.

TABLE I

| Example | Dispersant Composition | Wt. % in Oil | Wt. % Hydrophile in Blend | IFT Mdyne/cm | % Oil Dispersed |
|---|---|---|---|---|---|
| 1 | $C_{12}$XS-Et7/ | 0.2 | 67* | 21 | 85 |
|   | C12 XS-Et5 |     | 80  | 11 | 80 |
|   | 50% in Isopar | 0.4 | 67* | 17 | — |
|   | M |     | 80 | 8 | — |
| 2 | DM 530/$C_{12}$XS-MEA | 0.2 | 25 | 405 | 0 |
|   | 50% in 25% TAA, |     | 50* | 235 | 21 |
|   | 25% Isopar M |     | 75 | 223 | — |
|   |   | 0.4 | 25 | 343 | 49 |
|   |   |     | 50* | 50 | 75 |
|   |   |     | 75 | 80 | 70 |
| Comp.A | Corexit 9527 | 0.2 | — | 124 | 20 |
|   | 62.5% in Butyl Cellosolve | 0.4 | — | 34 | 84 |

*Denotes balanced surfactant blend

The data of Table I above illustrate the importance of employing a balanced surfactant blend or one which is shifted to the hydrophilic side as opposed to lipophilic. Futhermore, the relationship of interfacial tension versus % dispersion is also clearly shown, that is, the lower the interfacial tension of the system the greater the percent of dispersion. Also the composition of Example 1 is much more efficient as shown by its higher uptake, its lower IFT and its higher % oil dispersed at equivalent concentrations in oil.

EXAMPLES 3 TO 6 AND COMPARATIVE EXAMPLE B

Instead of the industry standard Mackay Oil Dispersion Test used for the above examples another procedure was followed. In this procedure a 500 ml graduated cylinder, cut down to 200 ml, was filled to the 100 ml mark with sea water (ASTM D-1141-52, as supplied by Lake Products Inc.). A quantity 25 ml of Murban crude oil was added to the sea water surface and the graduate placed on a stir plate. The stir plate was adjusted to generate a vortex with a tip that ranged around the 75 ml mark on the cylinder. When set, an amount, 100 microliters of surfactant blend was delivered by pipet onto the middle of the oil surface. The sample was stirred for 2 minutes at which time the shear was cut and the sample allowed to stand for another two minutes. A 25 ml aliquot was taken from the 50 ml mark area and a turbidity reading was taken on Hf Instruments Model No. DRT 100 turbidimeter. All amounts, surfactant blends, and turbidity are shown in Table II below.

TABLE II

| Dispersant[1] Composition | Wt. % Hydrophile In Blend | Turbidity Units | IFT[2] |
|---|---|---|---|
| $C_{12}XS$-Et7/ | 50 | 470 | 55 |
| $C_{12}XS$-Et5 | 67* | 6,300 | 17 |
| 50% in Isopar M | 80 | 8,650 | 8 |
| DM530/$C_{12}XS$-MEA | 25 | 385 | 343 |
| 50% in 25% TAA, | 62* | 5,200 | 31 |
| 25% Isopar M | 75 | 2,700 | 79 |
| Corexit 9527 62.5% in Butyl Cellosolve | | 7,550 | 34 |

[1]All dispersants tested at 0.4 wt. % based on crude oil
[2]Mdynes/cm
*Denotes balanced blend These examples illustrate the good correlation of this procedure with the Mackay procedure. For example, the degree of turbidity can be directly correlated with the % dispersion of the Mackay procedure. These examples again evidence the need for a surfactant system which is balanced or shifted to the hydrophilic side. It also evidences the inverse relationship of IFT to % dispersion.

EXAMPLE 7 AND COMPARATIVE EXAMPLE C

The Mackay procedure of Examples 1, 2, and Comp. A was followed except LaRosa crude was used instead of Murban crude. The amount of a specific surfactant blend used, IFT, and % dispersion is found in Table III below.

TABLE III

Mackay Dispersion Test Results vs. LaRosa/Sea Water IFT

| Dispersant Composition | Wt. % in Crude | Wt. % Hydrophile in Blend | IFT Mdyne/cm | % Crude Dispersed |
|---|---|---|---|---|
| DM 530/C12XS-MEA | .5 | 25 | 300 | 20 |
| 50% in 25% TAA, | | 75 | 200 | 30 |
| 25% Isopar ® M | .75 | 25 | 230 | 25 |
| | | 75 | 80 | 45 |
| | 1.0 | 25 | 210 | 30 |
| | | 75 | 35 | 55 |
| Corexit 9527 | .5 | — | — | 36 |
| 62.5% in Butyl | .75 | — | — | 70 |
| Cellusolve | 1.0 | — | — | 100 |

The above table illustrates that the effective amount of surfactant blend employed varies with the oil to be dispersed. It also illustrates that surfactant blends on the hydrophilic side of Balance are more effective at lowering IFT and improving oil dispersion.

What is claimed is:

1. A method for dispersing an oil spill on sea water which method comprises applying to the oil spill surface an effective amount of: (i) a blend of one or more hydrophilic and one or more lipophilic surfactants so balanced that they will form microemulsions with the sea water and the oil to be dispersed, (ii) a solvent which is miscible with the oil to be dispersed and in which the blend of surfactants is substantially soluble, and (iii) from 0 to about 10 wt.% water, wherein the blend of surfactants is such that it lowers the interfacial tension between the oil to be dispersed and the sea water to less than about 250 mdynes/cm when the blend is used at a treat rate of less than about 1 to 100 by weight, based on the oil to be dispersed.

2. The method of claim 1 wherein the solvent is a hydrocarbon solvent selected from the group consisting of No. 2 diesel fuel oil, kerosene, and white oil.

3. The method of claims 2 wherein a cosolvent is present and the cosolvent is selected from the group consisting of one or more alkylene glycol monoalkyl ethers and $C_2$ to $C_5$ alcohols.

4. The method of claim 3 wherein the cosolvent is tertiary amyl alcohol and is present in the range of about 10 to about 50 wt.% based on the total weight of the solvents employed.

5. The method of claim 3 wherein the blend of surfactants are comprised of two or more surfactants selected from one or both of:

(a) an alkali metal, ammonium, alkyl ammonium, alkanol ammonium or ethoxylated alkyl or alkanol ammonium salt of an alkyl or alkylaryl sulfonic acid of the generic formula:

$$R-SO_3H$$

wherein R is an alkyl or alkyl benzene group containing 8 to 30 carbon atoms in the alkyl chain and the benzene ring may be additional substituted with one or two alkyl groups containing 1-3 carbon atoms each, and (b) an ethoxylated surfactant of the generic formula:

$$R_1X(CH_2CH_2O)_nY$$

wherein
$R_1$ is an alkyl or mono- or di-alkyl aryl group containing 8 to 30 carbon atoms,
X is —O—, —S—,

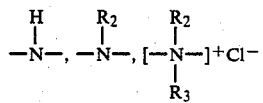

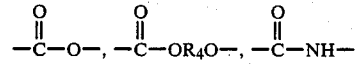

or —SO$_2$NH—
Y is —H, —SO$_3^-$M$^+$ or —(PO$_3$H)$^-$M$^+$ wherein M$^+$ is an inorganic on ammonium cation including alkyl substituted ammonium cations;

$R_2$ is an alkyl group containing 1 to 20 carbon atoms or a polyethoxy ether group containing from 1 to 30 ($CH_2CH_2O$) groups;

$R_3$ is H or an alkyl group containing 1 to 3 carbon atoms;

$R_4$ is a polyhydroxy group derived from glycerol, glycols, sorbitol, or various sugars; and n is an integer from 1 to 30.

6. The method of claim 5 wherein at least one of the surfactants is selected from the group consisting of ethoxylated alkyl phenols, alkyl and alkylaryl sulfonic acid salts wherein the alkyl group is a $C_9$–$C_{24}$ linear, branched, or bilinear structure, the aryl group is selected from benzene, toluene, orthoxylene, and naphthalene, and the salt is a salt of an alkali metal or an alkanol amine.

7. The method of claim 6 wherein at least one of the surfactants is an ethoxylated $C_{12}$–$C_{18}$ alkyl ammonium salt of a $C_9$–$C_{24}$ alkyl or alkylaryl sulfonic acid containing less than 6 ethylene oxide groups.

8. The method of claim 7 wherein at least one of the surfactants is an ethoxylated $C_{12}$–$C_{18}$ alkyl ammonium salt of a $C_9$–$C_{24}$ alkyl or alkylaryl sulfonic acid containing 6 or more ethylene oxide groups.

9. A method for dispersing an oil spill on sea water which method comprises applying to the oil spill surface an effective amount of:

(i) a blend of one or more hydrophilic and one or more lipophilic surfactants so balanced that they will form microemulsions with the sea water and the oil to be dispersed wherein the blend is comprised of two or more surfactants selected from one or both of:

(a) an alkali metal, ammonium, alkyl ammonium, alkanol ammonium or ethoxylated alkyl or alkanol ammonium salt of an alkyl or alkylaryl sulfonic acid of the generic formula:

R—SO$_3$H wherein R is an alkyl or alkyl benzene group containing 8 to 30 carbon atoms in the alkyl chain and the benzene ring may be additional substituted with one or two alkyl groups containing 1–3 carbon atoms each, and (b) an ethoxylated surfactant of the generic formula:

$R_1X(CH_2CH_2O)_nY$ wherein $R_1$ is an alkyl or mono- or di-alkyl aryl group containing 8 to 30 carbon atoms, X is —O—, —S—, 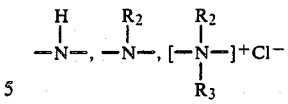

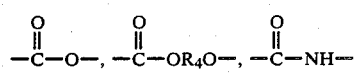

or —SO$_2$NH—

Y is —H, —SO$_3^-$M$^+$ or —(PO$_3$H)$^-$M$^+$ wherein M$^+$ is an inorganic on ammonium cation including alkyl substituted ammonium cations;

$R_2$ is an alkyl group containing 1 to 20 carbon atoms or a polyethoxy ether group containing from 1 to 30 ($CH_2CH_2O$) groups;

$R_3$ is H or an alkyl group containing 1 to 3 carbon atoms;

$R_4$ is a poly hydroxy group derived from glycerol, glycols, sorbitol, or various sugars; and n is an integer from 1 to 30;

(ii) a solvent which is miscible with the oil to be dispersed and in which the blend of surfactants is substantially soluble, and (iii) from 0 to about 10 wt.% water, wherein the blend of surfactants is such that it lowers the interfacial tension between the oil to be dispersed and the sea water to less than about 250 mdynes/cm when the blend is used at a treat rate of less than about 1 to 100 by weight, based on the oil to be dispersed.

10. The method of claim 9 wherein the solvent is a hydrocarbon solvent selected from the group consisting of No. 2 diesel fuel oil, kerosene, and white oil.

11. The method of claim 10 wherein a cosolvent is present and the cosolvent is selected from the group consisting of one or more alkylene glycol monoalkyl ethers and $C_2$ and $C_5$ alcohols.

12. The method of claim 11 wherein the cosolvent is tertiary amyl alcohol and is present in the range of about 10 to about 50 wt.% based on the total weight of the solvents employed.

13. The method of claim 9 wherein at least one of the surfactants is selected from the group consisting of ethoxylated alkyl phenols, alkyl and alkylaryl sulfonic acid salts wherein the alkyl group is a $C_9$ to $C_{24}$ linear, branched, or bilinear structure, the aryl group is selected from benzene, toluene, orthoxylene, naphthalene, and the salt is a salt of an alkali metal or an alkanol amine.

14. The method of claim 13 wherein at least one of the surfactants is an ethoxylated $C_{12}$–$C_{18}$ alkyl ammonium salt of a $C_9$–$C_{24}$ alkyl or alkylaryl sulfonic acid containing less than 6 ethylene oxide groups.

15. The method of claim 14 wherein at least one of the surfactants is an ethoxylated $C_{12}$–$C_{18}$ alkyl ammonium salt of a $C_9$–$C_{24}$ alkyl or alkylaryl sulfonic acid containing 6 or more ethylene oxide groups.

16. The method of claim 15 wherein the cosolvent is tertiary amyl alcohol and is present in the range of about 10 to about 50 wt.% based on the total weight of the solvents employed.

* * * * *